(12) United States Patent
Liao (10) Patent No.: US 10,038,791 B2
(45) Date of Patent: Jul. 31, 2018

(54) AUTOMATIC CALL FORWARDING METHOD AND SYSTEM BASED ON MOBILE TERMINAL, AND MOBILE TERMINAL

(71) Applicant: HUIZHOU TCL MOBILE COMMUNICATION CO., LTD., Guangdong (CN)

(72) Inventor: Ling Liao, Guangdong (CN)

(73) Assignee: HUIZHOU TCL MOBILE COMMUNICATIONS CO., LTD., Guangdong (CN)

( * ) Notice: Subject to any disclaimer, the term of this patent is extended or adjusted under 35 U.S.C. 154(b) by 0 days.

(21) Appl. No.: 15/519,119

(22) PCT Filed: Jul. 6, 2016

(86) PCT No.: PCT/CN2016/088818
§ 371 (c)(1),
(2) Date: Apr. 13, 2017

(87) PCT Pub. No.: WO2017/067232
PCT Pub. Date: Apr. 27, 2017

(65) Prior Publication Data
US 2018/0027121 A1 Jan. 25, 2018

(30) Foreign Application Priority Data
Oct. 23, 2015 (CN) .......................... 2015 1 0692463

(51) Int. Cl.
H04M 3/54 (2006.01)
H04W 4/02 (2018.01)
H04M 1/725 (2006.01)

(52) U.S. Cl.
CPC ....... *H04M 3/543* (2013.01); *H04M 1/72569* (2013.01); *H04M 1/72572* (2013.01); *H04W 4/023* (2013.01)

(58) Field of Classification Search
CPC ............. H04M 3/543; H04M 1/72569; H04M 1/72572; H04W 4/023
See application file for complete search history.

(56) References Cited

U.S. PATENT DOCUMENTS

2010/0009665 A1    1/2010    Hawkins et al.

FOREIGN PATENT DOCUMENTS

| CN | 1386001 | 12/2002 |
| CN | 2896714 | 5/2007 |
| CN | 101600152 | 12/2009 |

(Continued)

OTHER PUBLICATIONS

English abstract translation of CN105407469.
(Continued)

*Primary Examiner* — Keith Fang
(74) *Attorney, Agent, or Firm* — WPAT, PC (57) ABSTRACT

An automatic call forwarding method based on a mobile terminal, a system, and the mobile terminal, include: reading pre-stored control tag value of forwarding a current call if a mobile terminal device B receives a call request; automatically starting call forwarding and forwarding the call request of the mobile terminal device B to the mobile terminal device A if the control tag value of forwarding the current call is "true"; responding, by a mobile terminal A, to the call request according to a current call mode and a current signal mode.

10 Claims, 2 Drawing Sheets

(56) References Cited

FOREIGN PATENT DOCUMENTS

| CN | 104468962 | 3/2015 |
|----|-----------|--------|
| CN | 105306725 | 2/2016 |
| CN | 105407469 | 3/2016 |

OTHER PUBLICATIONS

English abstract translation of CN105306725.
English abstract translation of CN104468962.
English abstract translation of CN101600152.
English abstract translation of CN2896714.
English abstract translation of CN1386001.

AUTOMATIC CALL FORWARDING METHOD AND SYSTEM BASED ON MOBILE TERMINAL, AND MOBILE TERMINAL

CROSS REFERENCE TO RELATED APPLICATION

This application claims the benefit and priority of International Application No. PCT/CN2016/088818, filed on Jul. 6, 2016, which claims priority to Chinese Patent Application No. CN201510692463.3, filed Oct. 23, 2015, and entitled "Automatic Call Forwarding Method And System Based On Mobile Terminal, And Mobile Terminal". The entire disclosures of the above applications are incorporated herein by reference.

BACKGROUND

1. Field of the Disclosure

The present disclosure relates to the field of mobile terminals, and more particularly to an automatic call forwarding method and system based on a mobile terminal, and the mobile terminal.

2. Description of the Prior Art

Because mobile communication equipment is popular, various communications and contacts between people are made more convenient, easy, and real-time. A user can use mobile phones at any time and any place with family, friends, colleagues, clients, etc, for long-distance communication. Types of the mobile communication equipment, such as the mobile phones, tablets, have become more and more diversified, and smart wearable devices (such as smart watches, smart bracelets, and smart glasses). In short, there have been an increasing number of types of the mobile communication equipment, which have increasingly enrich and meet people communication and usage requirements. With people living standards increasing and with the diversification of the usage requirements, many people have one or more of the mobile communication equipment.

However, in real life, the user is not always able to receive a call request of another party in time. For example, the user usually forgets to carry the mobile communication equipment at home or in an office. At this time, the call request is coming and the user cannot respond immediately, which makes the user may miss more important and urgent information, further affecting life and work of the user and inconveniencing the user.

Therefore, the prior art needs to be improved and developed.

SUMMARY OF THE DISCLOSURE

Based on deficiency of the prior art, the aim of the present disclosure is to provide an automatic call forwarding method and system based on a mobile terminal, and the mobile terminal capable of responding a call request immediately and avoiding missing more important and urgent information through the present disclosure automatically forwards the call request to a mobile communication equipment carried by a user, further making convenience for work and life of the user.

In order to solve technical issue, the technical scheme of the present disclosure is as follows:

An automatic call forwarding method based on a mobile terminal, comprising:

step 10: detecting whether a mobile terminal device A and a mobile terminal device B associated with the mobile terminal device A are both on or not, reading a pre-stored control tag value of forwarding a current call if the mobile terminal device B receives a call request;

step 20: automatically starting call forwarding and forwarding the call request of the mobile terminal device B to the mobile terminal device A if the pre-stored control tag value of forwarding the current call is "true"; directly responding, by the mobile terminal device B, to the call request if the pre-stored control tag value of forwarding the current call is "false";

step 30: responding, by the mobile terminal A, to the call request according to a current call mode and a current signal mode; where the step 30 comprises:

directly responding, by the mobile terminal device A, to the call request if the current call mode of the mobile terminal device A indicates a 2G/3G/4G mobile network and the current signal mode of the mobile terminal device A indicates a 2G/3G/4G mobile signal;

responding, by the mobile terminal device A, to the call request with a Voice over-WIFI (VOWIFI) call method if the current call mode of the mobile terminal device A indicates a WIFI network and the current signal mode of the mobile terminal device A indicates a WIFI signal; and responding, by the mobile terminal device A, to the call request by sending a message, if the mobile terminal device A does not have a communication function and the mobile terminal device A currently does not have a signal mode.

The step 10 particularly comprises:

step 101: presetting and pre-storing a time interval threshold and a distance threshold in the mobile terminals;

step 102: respectively obtaining positional coordinates of the mobile terminal device A and the mobile terminal device B if the mobile terminal device A and the mobile terminal device B associated with the mobile terminal device A are both detected to be on;

step 103: calculating a current distance value between the mobile terminal device A and the mobile terminal device B according to the positional coordinates of the mobile terminal device A and the mobile terminal device B, and comparing the current distance value with the preset distance threshold by using the time interval threshold as a detection period;

step 104: setting and storing the control tag value of forwarding the current call as "false" if the current distance value is less than the distance threshold;

step 105: setting and storing control tag value of forwarding the current call as "true" if the current distance value is greater than the distance threshold.

An automatic call forwarding method based on a mobile terminal, comprising:

step 40: detecting whether a mobile terminal device A and a mobile terminal device B associated with the mobile terminal device A are both on or not; reading pre-stored control tag value of forwarding a current call if the mobile terminal device B receives a call request;

step 50: automatically starting call forwarding, and forwarding the call request of the mobile terminal device B to the mobile terminal device A if the pre-stored control tag value of forwarding the current call is "true"; and step 60: responding, by the mobile terminal device A, to the call request according to a current call mode and a current signal mode.

The step 40 particularly comprises:

step 401: presetting and pre-storing a time interval threshold and a distance threshold in the mobile terminal;

step 402: respectively obtaining positional coordinates of the mobile terminal device A and the mobile terminal device B if the mobile terminal device A and the mobile terminal device B associated with the mobile terminal device A are both detected to be on;

step 403: calculating a current distance value between the mobile terminal device A and the mobile terminal device B according to the positional coordinates of the mobile terminal device A and the mobile terminal device B, and comparing the current distance value with the preset distance threshold by using the time interval threshold as a detection period;

step 404: setting and storing the control tag value of forwarding the current call as "false" if the current distance value is less than the distance threshold;

step 405: setting and storing control tag value of forwarding the current call as "true" if the current distance value is greater than the distance threshold.

The automatic call forwarding method based on the mobile terminal, further comprising after the step 50:

directly responding, by the mobile terminal device B, to the call request if the pre-stored control tag value of forwarding the current call is "false".

The step 60 particularly comprises:

step 601: directly responding, by the mobile terminal device A, to the call request if the current call mode of the mobile terminal device A indicates a 2G/3G/4G mobile network and the current signal mode of the mobile terminal device A indicates a 2G/3G/4G mobile signal.

step 602: responding, by the mobile terminal device A, to the call request with a Voice over-WIFI (VOWIFI) call method if the current call mode of the mobile terminal device A indicates WIFI network and the current signal mode of the mobile terminal device A indicates WIFI signal.

step 603: responding, by the mobile terminal device A, to the call request by sending a message, if the mobile terminal device A does not have a call communication function or the mobile terminal device A currently does not have signal mode.

The time interval threshold is 1 minute, and the distance threshold is 5 meters.

An automatic call forwarding system based on a mobile terminal, comprising:

a call request module detecting a mobile terminal device A and a mobile terminal device B associated with the mobile terminal device A are both on, the mobile terminal device B reads a pre-stored control tag value of forwarding a current call if the mobile terminal device B receives a call request;

an automatic forwarding call request module automatically starting the call forwarding and forwarding the call request of the mobile terminal device B to the mobile terminal device A if the pre-stored control tag value of forwarding the current call is "true"; and a responding call request module responding to the call request for the mobile terminal device A according to a current call mode and a current signal mode.

The call request module particularly comprises:

a presetting unit presetting and pre-storing a time interval threshold and a distance threshold in the mobile terminal;

a positional coordinates obtaining unit obtaining positional coordinates of the mobile terminal device A and the mobile terminal device B if the mobile terminal device A and the mobile terminal device B associated with the mobile terminal device A are both detected to be on;

a distance value calculating unit calculating a current distance value between the mobile terminal device A and the mobile terminal device B according to the positional coordinates of the mobile terminal device A and the mobile terminal device, and comparing the current distance value with the preset distance threshold by using the time interval threshold as a detection period;

a first comparing unit setting and storing control tag value of forwarding the current call as "false" if the current distance value is less than the distance threshold; and a second comparing unit setting and storing control tag value of forwarding the current call as "true" if the current distance value is greater than the distance threshold;

where the automatic forwarding call request module comprises:

a directly responding call request unit directly responding to the call request for the mobile terminal device B if the pre-stored control tag value of forwarding the current call is "false".

The responding call request module comprises:

a first call request responding unit directly responding to the call request for the mobile terminal device A if the current call mode of the mobile terminal device A indicates a 2G/3G/4G mobile network and current signal mode of the mobile terminal device A indicates a 2G/3G/4G mobile signal;

a second call request responding unit responding to the call request with a VOWIFI call method for the mobile terminal device A if the current call mode of the mobile terminal device A indicates WIFI network and the current signal mode of the mobile terminal device A indicates WIFI signal; and a third call request responding unit responding to the call request by sending a message for the mobile terminal device A, if the mobile terminal device A does not have a call communication function or the mobile terminal device A currently does not have signal mode.

The time interval threshold is 1 minute, and the distance threshold is 5 meters.

A mobile terminal, comprising:

a call request module detecting a mobile terminal device A and a mobile terminal device B associated with the mobile terminal device A are both on; the mobile terminal device B reads a pre-stored control tag value of forwarding a current call if the mobile terminal device B receives a call request;

an automatic forwarding call request module automatically starting the call forwarding and forwarding the call request of the mobile terminal device B to the mobile terminal device A if the pre-stored control tag value of forwarding the current call is "true"; and a responding call request module responding to the call request for the mobile terminal device A according to a current call mode and a current signal mode.

The call request module comprises:
   a presetting unit presetting and pre-storing a time interval threshold and a distance threshold in the mobile terminal;
   a positional coordinates obtaining unit obtaining positional coordinates of the mobile terminal device A and the mobile terminal device B if the mobile terminal device A and the mobile terminal device B associated with the mobile terminal device A are both detected to be on;
   a distance value calculating unit calculating a current distance value between the mobile terminal device A and the mobile terminal device B according to the positional coordinates of the mobile terminal device A and the mobile terminal device, and comparing the current distance value with the preset distance threshold by using the time interval threshold as a detection period;
   a first comparing unit setting and storing control tag value of forwarding the current call as "false" if the current distance value is less than the distance threshold; and
   a second comparing unit setting and storing control tag value of forwarding the current call as "true" if the current distance value is greater than the distance threshold;
   where the automatic forwarding call request module further comprises:
a directly responding call request unit directly responding to the call request for the mobile terminal device B if the pre-stored control tag value of forwarding the current call is "false".

The responding call request module comprises:
   a first call request responding unit directly responding to the call request for the mobile terminal device A if the current call mode of the mobile terminal device A indicates a 2G/3G/4G mobile network and current signal mode of the mobile terminal device A indicates a 2G/3G/4G mobile signal;
   a second call request responding unit responding to the call request with a VOWIFI call method for the mobile terminal device A if the current call mode of the mobile terminal device A indicates a WIFI network and the current signal mode of the mobile terminal device A indicates a WIFI signal; and
   a third call request responding unit responding to the call request by sending a message way for the mobile terminal device A, if the mobile terminal device A does not have a call communication function or the mobile terminal device A currently does not have signal mode.

The time interval threshold is 1 minute, and the distance threshold is 5 meters.

The present disclosure provides the automatic call forwarding method and the system based on the mobile terminal and the mobile terminal, where the method comprises: detecting whether the mobile terminal device A and the mobile terminal device B associated with the mobile terminal device A are both on or not; reading the pre-stored control tag value of forwarding the current call if the mobile terminal device B receives the call request; automatically starting the call forwarding and forwarding the call request of the mobile terminal device B to the mobile terminal device A if the control tag value of forwarding the current call is "true"; responding, by the mobile terminal A, to the call request according to a current call mode and a current signal mode. The present disclosure automatically forwards the call request to the mobile communication equipment (namely the mobile terminal device A) carried by the user to respond the call request immediately. To be specific, a call automatic forwarding program is triggered to start via obtaining the actual distance between the two mobile communication equipment to respond to the call request immediately at any time and any place, which avoids a technical defects that a current called mobile communication equipment (namely the mobile terminal device B) not carried by the user cannot respond to the call request in real-time, further improving efficiency of call response of the mobile terminal, and being convenience for work and life of the user.

DETAILED DESCRIPTION

The present disclosure provides an automatic call forwarding method and system based on a mobile terminal, and the mobile terminal. In order to more clearly illustrate aim, the technical scheme and effects of the present disclosure, the present disclosure will further be described in detail. It should be understood that the present disclosure has been described with reference to certain preferred and alternative embodiments which are intended to be exemplary only and do not limit the full scope of the present disclosure.

Figure 1:
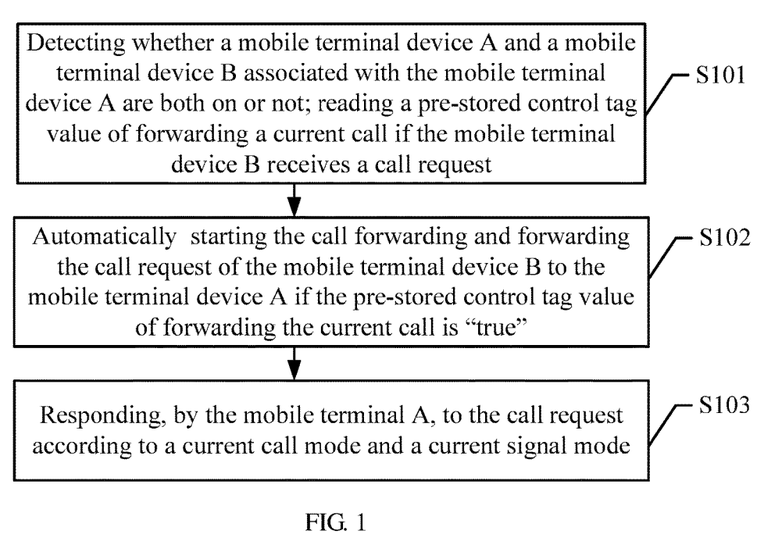
FIG. 1 is a flowchart of an automatic call forwarding method based on a mobile terminal according to a preferred embodiment of the present disclosure.

As shown in FIG. 1, FIG. 1 is a flowchart of an automatic call forwarding method based on a mobile terminal according to a preferred embodiment of the present disclosure. The automatic call forwarding method based on the mobile terminal in FIG. 1 comprises
   step (S) 101: detecting whether a mobile terminal device A and a mobile terminal device B associated with the mobile terminal device A are both on or not; reading a pre-stored control tag value of forwarding a current call if the mobile terminal device B receives a call request.

In the embodiment of the present disclosure, the step 101 comprises:
   S11: presetting and pre-storing a time interval threshold and a distance threshold in the mobile terminal;
   S12: respectively obtaining positional coordinates of the mobile terminal device A and the mobile terminal device B if the mobile terminal device A and the mobile terminal device B associated with the mobile terminal device A are both detected to be on;
   S13: calculating a current distance value between the mobile terminal device A and the mobile terminal device B according to the positional coordinates of the mobile terminal device A and the mobile terminal device B, and comparing the current distance value with the preset distance threshold by using the time interval threshold as a detection period;

S14: setting and storing the control tag value of forwarding the current call as "false" if the current distance value is less than the distance threshold;

S15: setting and storing control tag value of forwarding the current call as "true" if the current distance value is greater than the distance threshold;

In practical application, if two mobile communication equipment exist simultaneously, where the mobile terminal device A is a current mobile communication equipment carried by a user, and it is not limited that whether the mobile terminal device A has a call answering function or not. The mobile terminal device B is the current mobile communication equipment not carried by the user, where the mobile terminal device B has the call answering function. The mobile terminal device B is associated with the mobile terminal device A, when the mobile terminal device B cannot respond to the call and can forward the call to the mobile terminal device A.

When the mobile terminal device A and the mobile terminal device B are both on, the mobile terminal device B receives the call request, the mobile terminal determines whether the call forwarding executes or not according to the pre-stored control tag value of forwarding the current call, where the pre-stored control tag value of the current call forwarding is set according to the current distance between the mobile terminal device A and the mobile terminal device B. A setting rule is shown as follow: (1) presetting and pre-storing the time interval threshold and the distance threshold in the mobile terminal; (2) obtaining an actual distance value between the mobile terminal device A and the mobile terminal device B, and comparing the actual distance value with the preset distance threshold; (3) defining and setting the control tag value of forwarding the current call as "false" (namely ending a call forwarding function) if the actual distance value is less than the preset distance threshold. On the contrary, defining and setting the control tag value of forwarding the current call as "true" (namely starting the call forwarding function) if the actual distance value is greater than the preset distance threshold; (4) loop executing the step (2) to the step (3) according to the time interval threshold.

Furthermore, the time interval threshold may be 1 minute, and the distance threshold may be 5 meters. It should consider that obstacles (such as walls, stairways) may be between the mobile terminal device A and the mobile terminal device B, and the distance threshold may be reduced according to actual situations.

Furthermore, the embodiment of the present disclosure refers to calling, which is not limited to conventional call methods based on a 2G/3G/4G mobile network, also can be any other call methods based on Voice over WIFI (VOWIFI) or social applications (such as SKYPE). At the same time, the present disclosure refers that the mobile terminal devices can be any mobile communication equipment, where the mobile communication equipment can be any type, such as the mobile phones, tablets, and smart wearable devices (such as smart watches, smart bracelets, and smart glasses).

Step (s)102: automatically starting the call forwarding and forwarding the call request of the mobile terminal device B to the mobile terminal device A if the pre-stored control tag value of forwarding the current call is "true".

Step (s)103: responding, by the mobile terminal A, to the call request according to a current call mode and a current signal mode.

In the embodiment of the present disclosure, the step 103 comprises:

S31: directly responding, by the mobile terminal device A, to the call request if the current call mode of the mobile terminal device A indicates the 2G/3G/4G mobile network and the current signal mode of the mobile terminal device A indicates the 2G/3G/4G mobile signal.

S32: responding, by the mobile terminal device A, to the call request with the VOWIFI call method if the current call mode of the mobile terminal device A indicates WIFI network and the current signal mode of the mobile terminal device A indicates WIFI signal.

S33: responding, by the mobile terminal device A, to the call request by sending a message, if the mobile terminal device A does not have a communication function or the mobile terminal device A currently does not have a signal mode.

Namely, when the mobile terminal device B receives the call request, if the control tag value of forwarding the current call is "false" (namely ending the call forwarding function), the call forwarding function does not start. On the contrary, if the control tag value of forwarding the current call is "true" (namely starting the call forwarding function), the call forwarding function starts and the call request of the mobile terminal device B is forwarded to the mobile terminal device A. The call forwarding function comprises but is not limited to a call forwarding method based on 2G/3G/4G subscriber identity module (SIM) card or any type of the call forwarding function based on data traffic (comprising but not limited to internet protocol (IP) call based on voice call or video call of various social applications).

Furthermore, the mobile terminal device A receives the call request from the mobile terminal device B and correspondingly responds to the call request according to the current call mode and the current signal mode, which comprises but is not limited to the embodiment as follows:

a: the mobile terminal device A has 2G/3G/4G mode and can carry SIM card traffic for communication. When the mobile terminal device A receives the call request from the mobile terminal device B and has 2G/3G/4G mobile signal, the mobile terminal device A directly responds the call request, if the mobile terminal device A does not have 2G/3G/4G mobile signal, the mobile terminal device A can use way c to receive a message to remind;

b: the mobile terminal device A has WIFI mode and can carry data traffic for communication. When the mobile terminal device A receives the call request from the mobile terminal device B and has WIFI signal, the mobile terminal device A directly responds the call request using the VOWIFI or any communication ways based on the data traffic, if the mobile terminal device A does not have WIFI signal, the mobile terminal device A can use way c to receive the message to remind;

c: the mobile terminal device A does not have the communication function. When the mobile terminal device A receives the call request from the mobile terminal device B, the mobile terminal device A sends the message to notify receiver. The message may use some appearance forms such as a voice, a text, a picture, an indicator light, or uses one or more above appearance forms to reminder the receiver that there is the call request.

The present disclosure will further be described in detail in accordance with the figures and the exemplary examples.

The application embodiment comprises three steps: detecting the distance, controlling the call forwarding, and responding the call request.

1. Detecting the distance

Figure 2:
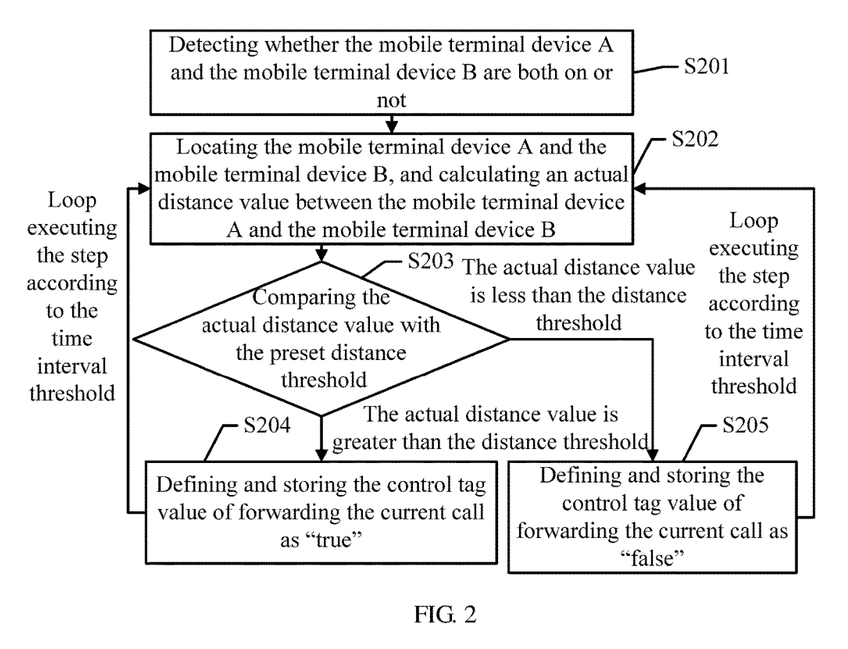
FIG. 2 is a first flowchart of the automatic call forwarding method based on the mobile terminal according to an application embodiment of the present disclosure.

Specifically, as shown in FIG. 2, comprising:

Step (S)201: detecting whether the mobile terminal device A and the mobile terminal device B are both on or not;

Step (S)202: locating the mobile terminal device A and the mobile terminal device B, and calculating an actual distance value between the mobile terminal device A and the mobile terminal device B;

Step (S)203: comparing the actual distance value with the preset distance threshold, if the actual distance value is greater than the distance threshold, entering step (S)204; if the actual distance value is less than the distance threshold, entering step (S)205;

Step (S)204: defining and storing the control tag value of forwarding the current call as "true" (namely starting the call forwarding function), and simultaneously executing the step 202 according to the preset time interval threshold, further comparing the actual distance value with the preset distance threshold in real-time;

Step (S)205: defining and storing the control tag value of forwarding the current call as "false" (namely ending the call forwarding function), and simultaneously executing the step 202 according to the preset time interval threshold, further comparing the actual distance value with the preset distance threshold in real-time.

As one of triggering conditions of the call forwarding, the application embodiment need to detect the actual distance between the mobile terminal device A and the mobile terminal device B associated with the mobile terminal device A, and sets the control tag value of forwarding the current call according to the actual distance. A setting rule is shown as follow: (1) presetting and pre-storing the time interval threshold and the distance threshold in the mobile terminal; (2) obtaining and recording the actual distance value between the mobile terminal device A and the mobile terminal device B, and comparing the actual distance value with the preset distance threshold; (3) defining and setting the control tag value of forwarding the current call as "false" (namely ending a call forwarding function) if the actual distance value is less than the preset distance threshold; on the contrary, defining and setting the control tag value of forwarding the current call as "true" (namely starting a call forwarding function) if the actual distance value is greater than the preset distance threshold; (4) loop executing the step (2) to the step (3) according to the time interval threshold.

Furthermore, the time interval threshold is regarded as a timekeeping to loop locate the mobile terminal device A and the mobile terminal device B, and calculate the actual distance value between the mobile terminal device A and the mobile terminal device B. It should be understood that the time interval threshold can be set by the factory or by the user, which is not limited by the present disclosure. Furthermore, the time interval threshold may be 1 minute.

Furthermore, the application embodiment obtains the actual distance between the two mobile communication equipment. First, the application embodiment has to obtain and record two locating data of the two mobile communication equipment. Based on the two locating data, the two locating data convert into two data in coordinate plane of same position, and specific positional difference between the two mobile communication equipment is calculated and recorded. Localization technology determining positions of the two mobile communication equipments comprise but is not limited some proven technologies as follows: indoor localization technology based on BLUETOOTH, localization technology based on WIFI signal, global navigation satellite system (GNSS) localization or GNSS localization having an auxiliary localization, a housing localization, a radio frequency identification devices (RFID) localization, ultrasonic localization, infrared localization, and so on. The above technologies derive and combine to various localization technologies and localization methods. The present disclosure takes localization information obtained by the above technologies as input parameter, and does not define and limit realization detail of the above technologies.

Furthermore, the preset distance threshold may any value set by the mobile terminal device or the user. Preferably, the preset distance threshold should be 5 meters or more. During using the indoor localization technology, the obstacles (such as walls, stairways) may be between the mobile terminal device A and the mobile terminal device B, and the distance threshold may be reduced according to actual situations.

2. Controlling the call forwarding

Figure 3:
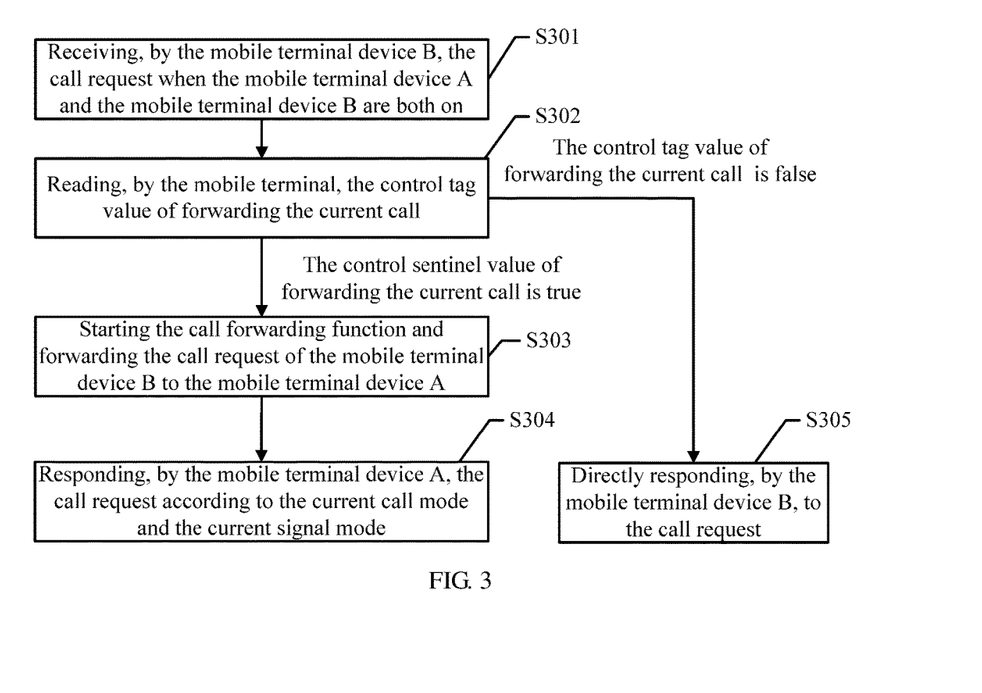
FIG. 3 a second flowchart of the automatic call forwarding method based on the mobile terminal according to the application embodiment of the present disclosure.

Specifically, as shown in FIG. 3, comprising:

Step (S)301: receiving, by the mobile terminal device B, the call request when the mobile terminal device A and the mobile terminal device B are both on;

Step (S)302: reading, by the mobile terminal, the control tag value of forwarding the current call; if the control tag value of forwarding the current call is false (ending the call forwarding function), further entering step 305; if the control tag value of forwarding the current call is true, further entering step 303;

Step (S)303: starting the call forwarding function and forwarding the call request of the mobile terminal device B to the mobile terminal device A if the control tag value of forwarding the current call is true (starting the call forwarding function), Step (S)304: responding, by the mobile terminal device A, to the call request according to the current call mode and the current signal mode;

Step (S) 305: directly responding, by the mobile terminal device B, to the call request.

Namely, when the mobile terminal device B receives the call request, the mobile terminal first reads the control tag value of forwarding the current call. If the control tag value of forwarding the current call is false, the call forwarding function does not start, and the mobile terminal device B directly responds. On the contrary, if the control tag value of forwarding the current call is true, the call forwarding function starts, and the call request of the mobile terminal device B is forwarded toward the mobile terminal device A. The call forwarding function comprises but is not limited a call forwarding method based on 2G/3G/4G subscriber identity module (SIM) card or any type of the call forwarding function based on data traffic (comprising but not limited: internet protocol (IP) call based on voice call or video call of various social applications).

3. Responding to the Call Request the mobile terminal device A receives the call request from the mobile terminal device B and the mobile terminal device A can use any way to respond. There are taking some ways for example, which is not limited the exemplary examples as follow:

a: the mobile terminal device A has 2G/3G/4G mode and can carry SIM card traffic for call communication. When the mobile terminal device A receives the call request from the mobile terminal device B and has 2G/3G/4G mobile signal, the mobile terminal device A directly responds the call request, if the mobile terminal device A does not have 2G/3G/4G mobile signal, the mobile terminal device A can use way c to receive the message to remind;

b: the mobile terminal device A has WIFI mode and can carry data traffic for call communication. When the mobile terminal device A receives the call request from the mobile terminal device B and has WIFI signal, the mobile terminal device A directly responds the call request using the VOWIFI or any communication ways based on the data traffic, if the mobile terminal device A does not have WIFI signal, the mobile terminal device A can use way c to receive the message to remind;

c: the mobile terminal device A does not have the communication function. When the mobile terminal device A receives the call request from the mobile terminal device B, the mobile terminal device A sends the message to notify receiver. The message may use some appearance forms such as a voice, a text, a picture, an indicator light, or uses one or more above appearance forms to reminder the receiver that there is the call request.

As the above, the present disclosure automatically forwards the call request to the mobile communication equipment (namely the mobile terminal device A) carried by the user to respond the call request in real-time. To be specific, a call automatic forwarding program is triggered to start via obtaining the actual distance between the two mobile communication equipment to respond the call request immediately at any time and any place, which avoids a technical defects that a current called mobile communication equipment (namely the mobile terminal device B) not carried by the user cannot respond the call request in real-time, further improving efficiency of call response of the mobile terminal, and being convenience for work and life of the user.

Figure 4:
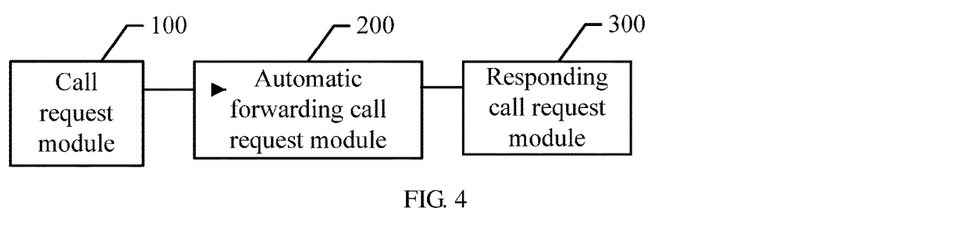
FIG. 4 is a schematic diagram of a functional module of the automatic call forwarding system based on the mobile terminal according to the preferred embodiment of the present disclosure.

Based on the above embodiment, the present disclosure provides an automatic call forwarding system based on the mobile terminal as shown in FIG. 4, comprise:

a call request module 100 detecting the mobile terminal device A and the mobile terminal device B associated with the mobile terminal device A are both on. If the mobile terminal device B receives the call request, the mobile terminal device B reads the pre-stored control tag value of forwarding the current call; the specific is described as the above;

an automatic forwarding call request module 200 automatically starting the call forwarding and forwarding the call request of the mobile terminal device B to the mobile terminal device A if the pre-stored control tag value of forwarding the current call is true; the specific is described as the above; and a responding call request module 300 responding to the call request for the mobile terminal device A according to the current call mode and the current signal mode; the specific is described as the above.

Furthermore, the call request module 100 particularly comprise:

a presetting unit presetting and pre-storing the time interval threshold and the distance threshold in the mobile terminal; the specific is described as the above;

a positional coordinates obtaining unit obtaining positional coordinates of the mobile terminal device A and the mobile terminal device B if the mobile terminal device A and the mobile terminal device B associated with the mobile terminal device A are both detected to be on; the specific is described as the above; and a distance value calculating unit calculating a current distance value between the mobile terminal device A and the mobile terminal device B according to the positional coordinates of the mobile terminal device A and the mobile terminal device, and comparing the current distance value with the preset distance threshold by using the time interval threshold as the detection period; the specific is described as the above;

a first comparing unit setting and storing control tag value of forwarding the current call as "false" if the current distance value is less than the distance threshold; the specific is described as the above; and a second comparing unit setting and storing control tag value of forwarding the current call as "true" if the current distance value is greater than the distance threshold; the specific is described as the above.

Furthermore, the automatic forwarding call request module 200 comprise:

a directly responding call request unit directly responding to the call request for the mobile terminal device B if the pre-stored control tag value of forwarding the current call is "false"; the specific is described as the above.

Furthermore, the responding call request module 300 comprises:

a first call request responding unit directly responding to the call request for the mobile terminal device A if the current call mode of the mobile terminal device A indicates the 2G/3G/4G mobile network and the current signal mode of the mobile terminal device A indicates the 2G/3G/4G mobile signal; the specific is described as the above;

a second call request responding unit responding to the call request with VOWIFI call method for the mobile terminal device A if the current call mode of the mobile terminal device A indicates a WIFI network and the current signal mode of the mobile terminal device A indicates a WIFI signal mode; the specific is described as the above; and a third call request responding unit responding to the call request by by sending a message for the mobile terminal device A, if the mobile terminal device A does not have a call communication function or the mobile terminal device A currently does not have wireless signal; the specific is described as the above.

Furthermore, the present disclosure sets that the time interval threshold is 1 minute, and the distance threshold is 5 meters.

Furthermore, the present disclosure provides the mobile terminal, where the mobile terminal comprises any of the above automatic call forwarding system based on the mobile terminal.

As the above, the present disclosure provides the automatic call forwarding method and the system based on the mobile terminal, and the mobile terminal, where the method comprises: detecting the mobile terminal device A and the mobile terminal device B associated with the mobile terminal device A are both on; reading the pre-stored control tag value of forwarding the current call if the mobile terminal device B receives the call request; automatically starting the call forwarding and forwarding the call request of the mobile terminal device B to the mobile terminal device A if the control tag value of forwarding the current call is "true"; responding, by the mobile terminal A, to the call request according to a current call mode and a current signal mode.

The present disclosure automatically forwards the call request to the mobile communication equipment (namely the mobile terminal device A) carried by the user to respond the call request immediately. To be specific, a call automatically forwarding program is triggered to start via obtaining the actual distance between the two mobile communication equipment to respond to the call request immediately at any time and any place, which avoids a technical defects that a current called mobile communication equipment (namely the mobile terminal device B) not carried by the user cannot respond the call request immediately, further improving efficiency of call response of the mobile terminal, and being convenience for work and life of the user.

It should be understood that the present disclosure has been described with reference to certain preferred and alternative embodiments which are intended to be exemplary only and do not limit the full scope of the present disclosure as set fourth in the appended claims.

What is claimed is:

1. An automatic call forwarding method based on a mobile terminal, comprising:
   presetting and pre-storing a time interval threshold and a distance threshold in the mobile terminal;
   obtaining positional coordinates of a first mobile terminal device and a second mobile terminal device if the first mobile terminal device and the second mobile terminal device associated with the first mobile terminal device are both detected to be on;
   calculating a current distance value between the first mobile terminal device and the second mobile terminal device according to the positional coordinates of the first mobile terminal device and the second mobile terminal device, and comparing the current distance value with the preset distance threshold by using the time interval threshold as a detection period;
   setting and storing the control tag value of forwarding the current call as "false" if the current distance value is less than the distance threshold;
   setting and storing control tag value of forwarding the current call as "true" if the current distance value is greater than the distance threshold;
   automatically starting call forwarding, and forwarding the call request of the second mobile terminal device to the first mobile terminal device if the pre-stored control tag value of forwarding the current call is "true"; and
   responding, by the first mobile terminal device, to the call request according to a current call mode and a current signal mode.

2. The automatic call forwarding method based on the mobile terminal as claimed in claim 1, further comprising after the step of automatically starting call forwarding, and forwarding the call request of the second mobile terminal device to the first mobile terminal device if the pre-stored control tag value of forwarding the current call is "true":
   directly responding, by the second mobile terminal device, to the call request if the control tag value of forwarding the pre-stored current call is "false".

3. The automatic call forwarding method based on the mobile terminal as claimed in claim 2, wherein the step of responding, by the first mobile terminal device, to the call request according to a current call mode and a current signal mode, comprises:
   directly responding, by the first mobile terminal device, to the call request if the current call mode of the first mobile terminal device indicates a 2G/3G/4G mobile network and the current signal mode of the first mobile terminal device indicates a 2G/3G/4G mobile signal;
   responding, by the first mobile terminal device, to the call request with a Voice over-WIFI (VOWIFI) call method if the current call mode of the first mobile terminal device indicates a WIFI network and the current signal mode of the first mobile terminal device indicates a WIFI signal;
   responding, by the first mobile terminal device, to the call request by sending a message, if the first mobile terminal device does not have a call communication function or the first mobile terminal device currently does not have a signal mode.

4. The automatic call forwarding method based on the mobile terminal as claimed in claim 1, wherein the time interval threshold is 1 minute, and the distance threshold is 5 meters.

5. An automatic call forwarding system based on a mobile terminal, comprising:
   a call request module comprising a presetting unit presetting and pre-storing a time interval threshold and a distance threshold in the mobile terminal, a positional coordinates obtaining unit obtaining positional coordinates of a first mobile terminal device and a second mobile terminal device if the first mobile terminal device and the second mobile terminal device associated with the first mobile terminal device are both detected to be on, a distance value calculating unit calculating a current distance value between the first mobile terminal device and the second mobile terminal device according to the positional coordinates of the first mobile terminal device and the mobile terminal device, and comparing the current distance value with the preset distance threshold by using the time interval threshold as a detection period, a first comparing unit setting and storing control tag value of forwarding the current call as "false" if the current distance value is less than the distance threshold, and a second comparing unit setting and storing control tag value of forwarding the pre-stored current call as "true" if the current distance value is greater than the distance threshold;
   wherein the automatic forwarding call request module comprises: a directly responding call request unit directly responding to the call request for the second mobile terminal device if the pre-stored control tag value of forwarding the current call is "false";
   an automatic forwarding call request module automatically starting the call forwarding and forwarding the call request of the second mobile terminal device to the first mobile terminal device if the pre-stored control tag value of forwarding the current call is "true"; and
   a responding call request module responding to the call request for the first mobile terminal device according to a current call mode and a current signal mode.

6. The automatic call forwarding system based on the mobile terminal as claimed in claim 5, the responding call request module comprises:
   a first call request responding unit directly responding to the call request for the first mobile terminal device if the current call mode of the first mobile terminal device indicates a 2G/3G/4G mobile network and current signal mode of the first mobile terminal device indicates a 2G/3G/4G mobile signal;
   a second call request responding unit responding to the call request with a Voice over-WIFI (VOWIFI) call method for the first mobile terminal device if the current call mode of the first mobile terminal device indicates a WIFI network and the current signal mode of the first mobile terminal device indicates a WIFI signal; and a third call request responding unit responding to the call request by sending a message for the first mobile terminal device, if the first mobile terminal device does not have a call communication function or the first mobile terminal device currently does not have signal mode.

7. The system of the automatic call forwarding based on the mobile terminal as claimed in claim 5, wherein the time interval threshold is 1 minute, and the distance threshold is 5 meters.

8. A mobile terminal, comprising:

a call request module comprising a presetting unit presetting and pre-storing a time interval threshold and a distance threshold in the mobile terminal, a positional coordinates obtaining unit obtaining positional coordinates of a first mobile terminal device and a second mobile terminal device if the first mobile terminal device and the second mobile terminal device associated with the first mobile terminal device are both detected to be on, a distance value calculating unit calculating a current distance value between the first mobile terminal device and the second mobile terminal device according to the positional coordinates of the first mobile terminal device and the mobile terminal device, and comparing the current distance value with the preset distance threshold by using the time interval threshold as a detection period, a first comparing unit setting and storing control tag value of forwarding the current call as "false" if the current distance value is less than the distance threshold, and a second comparing unit setting and storing control tag value of forwarding the pre-stored current call as "true" if the current distance value is greater than the distance threshold;

wherein the automatic forwarding call request module comprises: a directly responding call request unit directly responding to the call request for the second mobile terminal device if the pre-stored control tag value of forwarding the current call is "false";

an automatic forwarding call request module automatically starting call forwarding and forwarding the call request of the second mobile terminal device to the first mobile terminal device if the pre-stored control tag value of forwarding the current call is "true"; and a responding call request module responding to the call request for the first mobile terminal device according to a current call mode and a current signal mode.

9. The mobile terminal as claimed in claim 8, the responding call request module comprises:

a first call request responding unit directly responding to the call request for the first mobile terminal device if the current call mode of the first mobile terminal device indicates a 2G/3G/4G mobile network and current signal mode of the first mobile terminal device indicates a 2G/3G/4G mobile signal;

a second call request responding unit responding to the call request with a Voice over-WIFI (VOWIFI) call method for the first mobile terminal device if the current call mode of the first mobile terminal device indicates a WIFI network and the current signal mode of the first mobile terminal device indicates a WIFI signal; and a third call request responding unit responding to the call request by sending a message for the first mobile terminal device, if the first mobile terminal device does not have a call communication function or the first mobile terminal device currently does not have signal mode.

10. The mobile terminal as claimed in claim 8, wherein the time interval threshold is 1 minute, and the distance threshold is 5 meters.

* * * * *